(12) United States Patent
Hille et al.

(10) Patent No.: US 6,722,152 B1
(45) Date of Patent: Apr. 20, 2004

(54) FRESH AIR INTAKE FILTER AND MULTI FUNCTION GRILL

(75) Inventors: Andreas Hille, Renningen (DE); Robert C. Reimann, LaFayette, NY (US); Belin Czechowicz, Dewitt, NY (US); Stephen Stopyra, Syracuse, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/429,451

(22) Filed: May 5, 2003

(51) Int. Cl.[7] .............................. F25D 23/12; F25J 5/00; B60H 3/06
(52) U.S. Cl. ........................ 62/262; 454/158; 62/908
(58) Field of Search .................. 62/262, 908; 454/158

(56) References Cited

U.S. PATENT DOCUMENTS

| | | | | |
|---|---|---|---|---|
| 5,943,872 A | * | 8/1999 | Sakurada et al. | ............. 62/262 |
| 6,000,234 A | * | 12/1999 | Baek | ........................... 62/262 |
| 6,062,975 A | * | 5/2000 | Knudtson | ................... 454/138 |
| 6,223,547 B1 | * | 5/2001 | da Silva et al. | .............. 62/262 |
| 6,389,832 B1 | * | 5/2002 | Wu | ............................... 62/262 |
| 6,497,740 B1 | * | 12/2002 | Moretti | ....................... 55/418 |
| 6,571,570 B1 | * | 6/2003 | Phillips | ....................... 62/262 |

* cited by examiner

Primary Examiner—William C. Doerrler
Assistant Examiner—Filip Zec
(74) Attorney, Agent, or Firm—Wall Marjama & Bilinski LLP

(57) ABSTRACT

In a bus rooftop air conditioner having a fresh air inlet for routing fresh air to an evaporator coil by way of a passageway and including a frame located in the passageway for the receiving a filter therein. A hinge mounted grill has a body portion for covering the fresh air inlet, while at the same time having a extended arm coming into contact with the filter to hold it in position. The filter can be removed and replaced by simply rotating the grill member to an open position to thereby disengage the extended arm from the filter and allow it to be removed. The grill member has integrally connected and substantially normally extending guide vanes near its other end which, when the grill is the covering position, extends into a condenser discharge opening to thereby act as diffusers within that opening.

25 Claims, 2 Drawing Sheets

FRESH AIR INTAKE FILTER AND MULTI FUNCTION GRILL

CROSS REFERENCE TO RELATED APPLICATIONS

This application is related to the following pending applications being concurrently filed herewith and assigned to the assignee of the present invention:

| Title | Our Docket No.: |
| --- | --- |
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

BACKGROUND OF THE INVENTION

This invention relates generally to air conditioners and, more particularly, to an air conditioner for the rooftop of a bus.

In order to maintain a healthy environment inside an air conditioned passenger compartment of a vehicle such as a bus, it is necessary to bring in a certain amount of outside air to replenish the air stream within the vehicle. Thus, a supply of outside air is introduced and mixed into the supply air stream of the air conditioning system, while at the same time a portion of the return air from the vehicle is allowed to pass through the condenser coil and flow to the outside. As the fresh air is introduced into the interior of the passenger compartment by way of the evaporator coil, it must be filtered to remove contaminants that may be present from the exterior road environment.

In addition to the filter, it is also common to provide a grill at the inlet for the fresh air opening with, the function of the grill being twofold. First, it provides protection against the entry of coarser materials such as debris and the like, into the fresh air inlet flowstream, a portion of which passes to the condenser coil, and a portion of which passes to the evaporator coil for replenishment as mentioned above. Secondly, the grill provides for human safety near the rotating air moving devices.

While both the filter and grill are considered important functions to such a rooftop air conditioner, it is desirable to reduce the number of parts, and therefore the cost and complexity, of the system. This reduction in parts is made more difficult by the need to periodically move and replace the filter and also to hold the filter in its installed position.

It is therefore an object of the present invention to provide an improved air conditioning system for a bus rooftop.

Another object of the present invention is the provision for reducing the number of parts in the air conditioning system.

Yet another object of the present invention is the provision for fresh air filter that can be easily removed and replaced.

Still another object of the present invention is the provision in a bus top air conditioner for retaining a fresh air filter in its installed position.

Still another object of the present invention is the provision for a bus rooftop air conditioner that is economical to manufacture and effective and efficient in use.

These objects and other feature and advantages become more readily apparent upon reference to the following descriptions when taken in conjunction with the appended drawings.

SUMMARY OF THE INVENTION

Briefly, in accordance with one aspect of the invention, a cavity or pocket is provided to removable receive a filter, and a grill is positioned near the filter such that a portion of the grill structure acts to engage the filter and hold it in its installed position.

In accordance with another aspect of the invention, an L-shaped grill is hingedly attached near the filter, with one arm acting as a closure for the fresh air intake opening, and the other arm coming to rest against the filter to hold it in place when the grill is in the closed position. To remove and replace the filter, the grill is simply hinged openly, to thereby allow the filter to be removed and replaced.

By yet another aspect of the invention, that portion of the grill which closes the air intake opening has an extended free end with, a plurality of attached guide vanes which, when the grill is in the closed position extend toward the condenser blower to thereby act as an air diffuser section for the air that is being discharged from the condenser coil.

In the drawings as hereinafter described, a preferred embodiment is depicted; however various other modifications and alternate constructions can be made thereto without departing from the true spirit and scope of the invention.

DESCRIPTION OF THE PREFERRED EMBODIMENT

Figure 1:
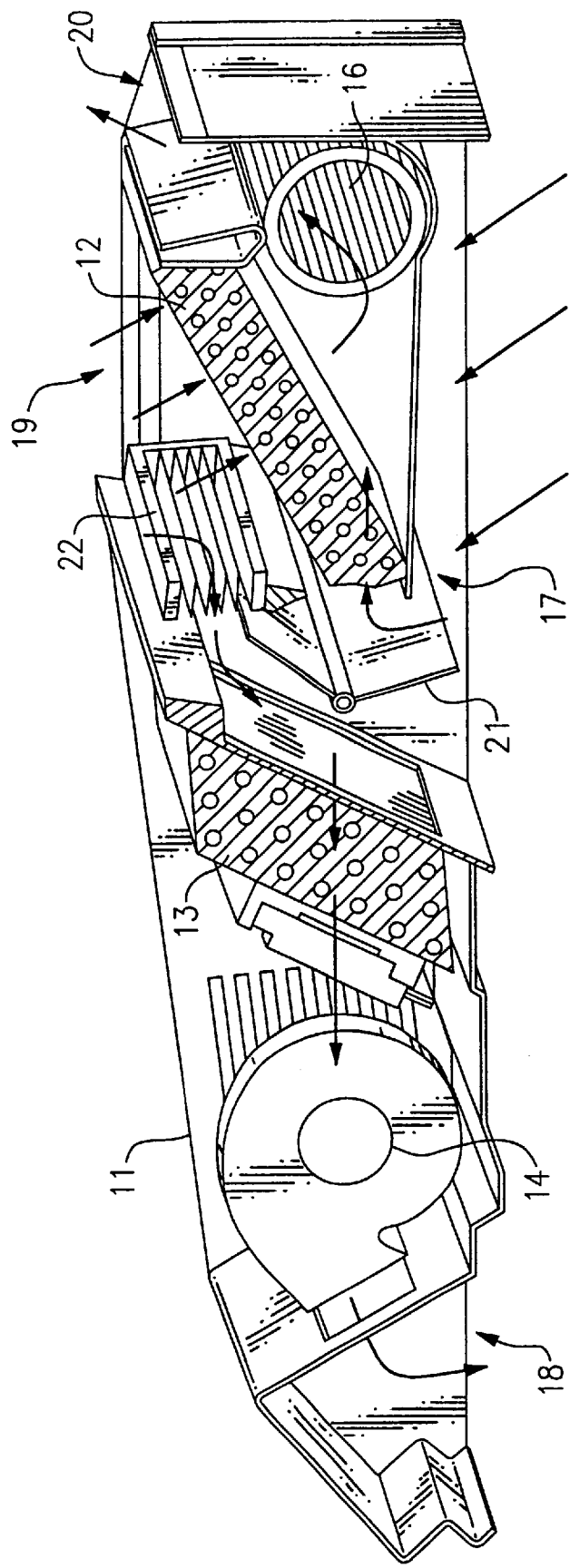
FIG. 1 is a perspective view of an air conditioner of the present invention with a portion broken away.

Referring now to FIG. 1, there is shown an air conditioning system having a housing 11, and within the housing is a condenser coil 12 and an evaporator coil 13. The condenser coil 12 and the evaporator coil 13 are connected in a refrigeration circuit for circulating refrigerant from a compressor (not shown), to the condenser coil 12, to an expansion valve, to the evaporator coil and finally back to the compressor to complete the circuit. This refrigerant circuit is accomplished in a conventional manner.

The flow of air through the system is controlled by a pair of motor driven blowers or fans. An evaporator blower 14 provides for the draw of air through the evaporator coil 13, whereas a transverse fan 16 provides for the draw of air through the condenser coil 12.

In order to accommodate the flow of air into and out of the housing 11, there are a plurality of openings provided therein. A return air opening 17 is provided in a lower surface of the housing 11 to permit the return air from the vehicle below to pass into the air conditioning system. Similarly, a supply air opening 18 is provided near the other end of the system to cause the flow of conditioned air from the system to flow downwardly into the vehicle to be conditioned. A fresh air opening 19 is provided to permit outside air to enter the air conditioning housing 11.

Considering now the flow of air within the system, the arrows indicate generally the direction of air flowing through the various openings and within the system. First, the return air flowing through the return air opening 17 is split into two air flow streams, one being drawn by the transverse fan 16 to be discharged outside the system. The other portion is directed to flow toward the evaporator coil, and may be selectively mixed with a flow of fresh air as will be described.

The fresh air from outside passes through the fresh air opening 19, with at least a portion passing through the condenser coil for the purpose of condensing the refrigerant vapor passing through the condenser coil. After passing through the condenser coil the air stream is then caused to flow, by way of the transverse fan 16 to the outside.

Another smaller portion of the fresh air flow can be caused to pass toward the evaporator coil to be mixed with the return air coming up through the return air opening 17. The relative amounts of each of these air flow streams that is mixed depends on the position of an air flap 21 which is driven by a gear motor. Thus, the air flap 21 can be placed in one position such that only return air passes to the evaporator coil 13 and no fresh air is allowed to pass. Similarly, the air flap 21 may be placed in a position wherein no return air passes to the evaporator coil 31 and only fresh air is allowed to so pass. The more common position for the air flap 21, however, is in a position between those to extremes such that the mix of return air and outside fresh air is balanced to meet the particular operating needs and prevailing atmospheric conditions. After passing through the evaporator coil the conditioned air is caused by the evaporator blower 14 to flow through the supply opening 18 as discussed hereinabove.

Inasmuch as the air within the vehicle, i.e. the conditioned air in its various stages as it passes from the air conditioner, through the vehicle and back to the air conditioner as return air, is relatively clean air, it is desirable to provide a filter to filter out solid impurities that may be in the fresh air coming into the system. While that portion of the fresh air passing through the condenser coil will eventually pass outside the system, that portion entering the mixing stage and finally passing into the evaporator will eventually pass into the conditioned vehicle and therefore should be relatively clean. For that reason, a filter 22 is provided at the point where the fresh air enters the mixing stage as shown in FIG. 1.

Figure 2:
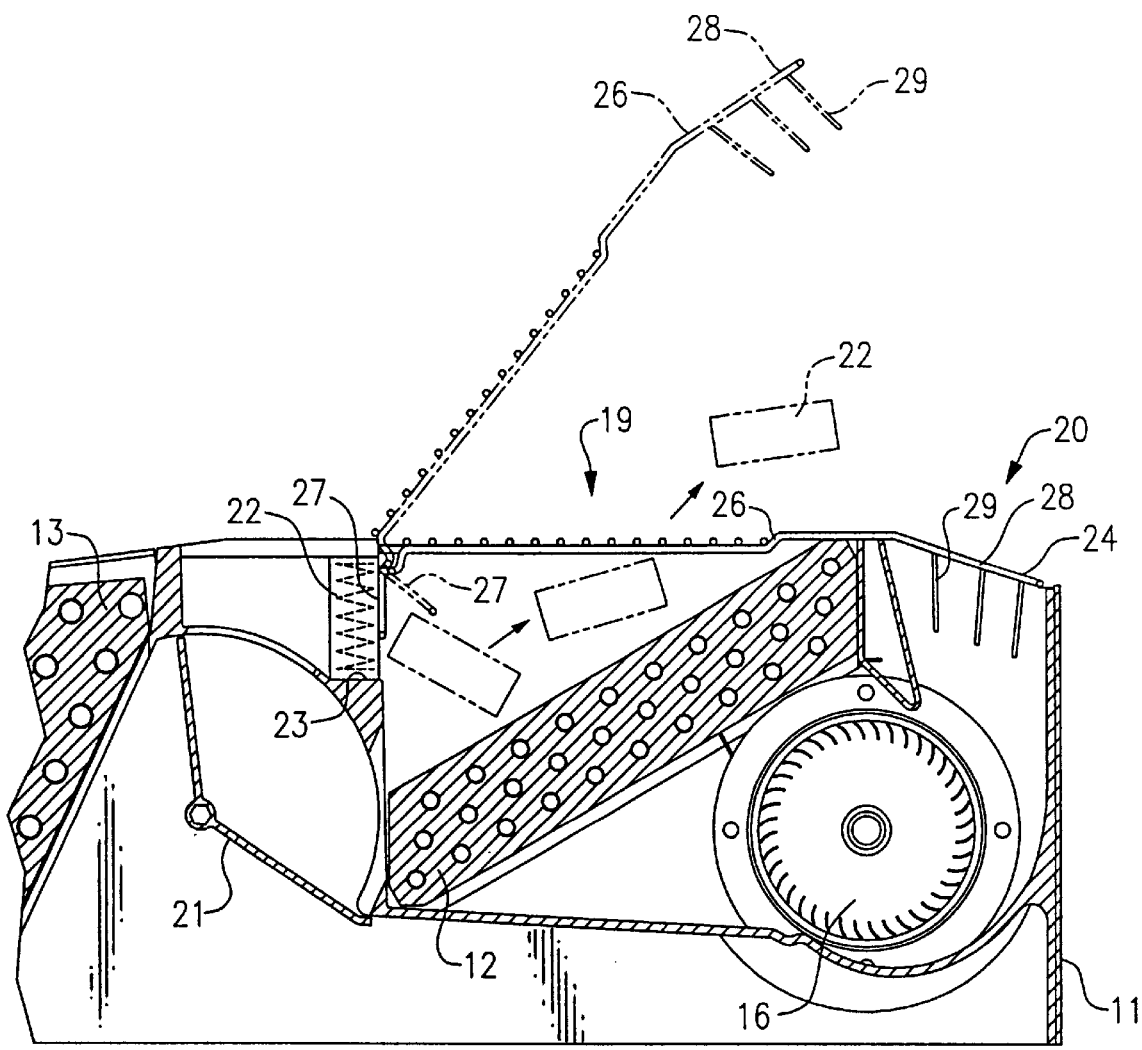
FIG. 2 is an enlarged perspective view of a portion thereof.

Referring now to FIG. 2, the filter 22 is shown in its installed position within a pocket formed of a sheet metal frame 23. In accordance with the present invention the filter 22 is removably held in this installed position by way of grill 24.

The grill 24 is an L-shaped member comprised of a cover portion 26 and a retaining arm portion 27. The grill 24 is hingedly attached to the housing 11 at the point where the two portions are interconnected. When the grill 24 is in the closed position as shown by the solid line depiction thereof, it covers both the fresh air opening 19 and the condenser blower discharge opening 20 as shown. In this closed position it provides for a number of functions. It prevents foreign material from entering the fresh air opening 19 and the condenser blower discharge opening 20 where it could cause damage or reduce performance of the associated components. It also protects an operator against the possible harmful contact with the rotating blower wheel below. It accomplishes both of these functions while providing a low pressure drop at the entering air passageway and at the discharge air opening 20.

Another function of the grill when in the closed position is to retain the filter 22 in its installed position by way of the retaining arm portion 27 which abuts the one side of the filter 22.

For purpose of removing and replacing the filter 22, the grill 24 is hingedly moved to the open position as shown by the dotted line configuration. Here, the retaining arm portion 27 is moved away from the filter 22 so as to allow its removal as shown by the dotted line depiction of the filter 22. After removal, a new filter can be inserted into the retaining pocket and the grill 24 can be again closed so as to retain it in that position.

In addition to the removal and replacement of the filter 22, the hinged grill 24 may also be opened for purposes of general service to the unit and for removal of foreign material which may pass through the relatively course openings of the grill 24 to enter the condenser unit and blower outlet areas.

In addition to the retaining arm portion 27 which extends from one end of the grill cover portion 26, there are integrally attached to and projecting from an extension 28 of the cover portion 26, a plurality of guide vanes 29 as shown. When the grill member 24 is in a closed position, these guide vanes 29 project into the condenser blower discharge opening 20 to thereby create a high efficiency low loss diffusion of the blower discharge air with minimal pressure loss.

Figure 3:
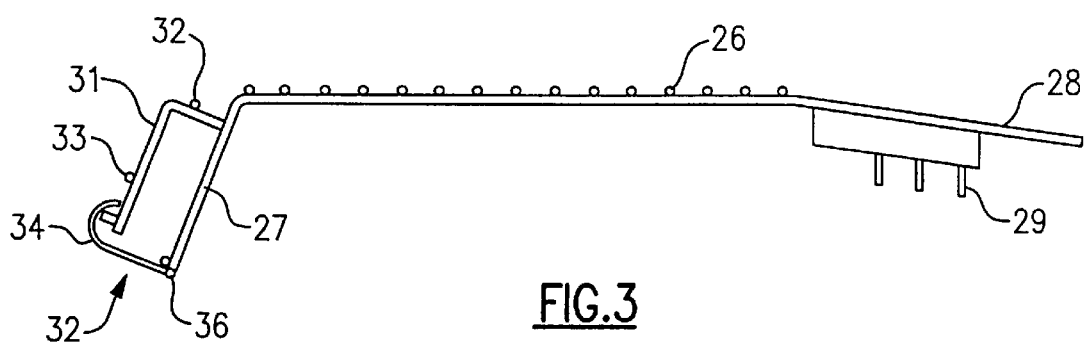
FIG. 3 is a side view of a modified version of the grill portion thereof.

Referring to FIG. 3, an alternate embodiment of the grill 24 is shown to include an L-shaped extension 31 attached to the arm portion 27 to form a pocket 32 for receiving the filter 22. The pocket 32 which is formed by the sides 27, 32 and 33, has an open end by which the filter can be easily removed and replaced in the pocket. With this structure the pocket 32 performs at least part of the function of the pocket 23, and therefore the pocket 23 may be at least partially eliminated. For example, if a fourth side 34 is added to the retaining arm portion 27 by a hinge 36 or the like, then the pocket 23 could be eliminated, with the pocket 32 completely serving that function.

It should be understood that the invention may be embodied in other specific forms without departing from the true spirit and scope of the invention as described herein. The present examples and embodiments, therefore, are to be considered in all respects as illustrative and not restricted, and the invention is not limited to the details given herein. For example, although the grill member has been shown as an L-shaped member hingedly attached to the housing, it may take other forms and may be otherwise attached as, for example, by being entirely removably inserted into a retaining structure.

We claim:

1. An air conditioner for mounting on the rooftop of a bus comprising:

a housing having openings therein for receiving a return air flow and a fresh air flow and for discharging conditioned air;

an evaporator coil for receiving a return air flow and/or a fresh air flow;

a condenser coil for receiving a fresh air flow and/or a return air flow;

a filter positioned such that the fresh air flowing to said evaporator coil passes therethrough; and a grill positioned near said condenser coil to selectively cover and/or uncover said fresh air opening in said housing, said grill having an extended arm which, when said grill is in the covered position, acts to engage a side of said filter held in position, and when said grill is in the uncovered position, allows said filter to be removed.

2. An air conditioner as set forth in claim 1 wherein said grill is attached to said housing by a hinge.

3. An air conditioner as set forth in claim 2 wherein said hinge is located at one end of said extended arm.

4. An air conditioner as set forth in claim 3 wherein said grill includes a main body and an extended arm and further wherein said hinge is located between the two.

5. An air conditioner as set forth in claim 1 wherein said housing also includes a discharge opening for the discharge of air from said condenser coil and further wherein said grill includes an extension which, when the grill is in the covered position, covers said discharge opening.

6. An air conditioner as set forth in claim 5 wherein said extension includes at least one guide vane extending into said discharge opening.

7. An air conditioner as set forth in claim 6 wherein at least one guide vane includes a plurality of guide vanes.

8. An air conditioner system having a housing with an opening for the admission of fresh air to flow through a passageway to an evaporator coil, an improved filter arrangement comprising:

a frame positioned within the passageway for receiving a filter in one side thereof; and a grill for selectively positioning within the fresh air opening, said grill having a body portion and a retaining arm portion;

wherein, when said grill is so positioned within the fresh air opening, said retaining arm portion engages one side of the filter so as to hold it in said frame, and when said grill is removed from its position within the fresh air opening, the filter can be removed from said frame.

9. An air conditioning filter arrangement as set forth in claim 8 wherein said grill is connected to said frame by way of a hinge.

10. An air conditioning filter arrangement as set forth in claim 9 wherein said hinge is located between said body portion and said retaining arm portion of said grill.

11. An air conditioning filter arrangement as set forth in claim 8 wherein said grill retaining arm portion is disposed substantially normally to said grill body portion.

12. An air conditioning filter arrangement as set forth in claim 8 wherein said housing also includes a condenser coil positioned near said fresh air opening such that fresh air also passes through said condenser coil.

13. An air conditioning filter arrangement as set forth in claim 8 wherein said housing also includes a condenser discharge opening and further wherein said grill includes an extension which covers said discharge opening when said grill is in position within the fresh air opening.

14. An air conditioning filter arrangement as set forth in claim 13 wherein said extension includes at least one guide vane extending into said discharge opening.

15. An air conditioning filter arrangement as set forth in claim 14 wherein said at least one guide vane includes a plurality of guide vanes.

16. A method of installing and retaining a filter in an air conditioning system having a fresh air opening for conducting the flow of fresh air to a passageway leading to an evaporator coil, comprising the steps of:

providing a grill with a body portion and a retainer arm portion;

providing a frame within the passageway for removably receiving a filter therein;

installing a filter in said frame; and said grill into a closed position such that the body portion covers said fresh air opening and said retainer arm portion simultaneously engages said filter to hold it in its installed position.

17. A method as set forth in claim 16 wherein and including the step of moving said grill to an open position such that said retainer arm portion disengages from said filter and allows it to be removed.

18. A method as set forth in claim 16 wherein said grill is attached near one end thereof by way of a hinge.

19. A method as set forth in claim 17 wherein said hinge is located between said body portion and said retainer arm portion.

20. A method as set forth in claim 15 wherein said air conditioner also includes a condenser blower that causes air to be discharged from a discharge opening.

21. A method as set forth in claim 20 wherein said grill includes an extended portion which, when the grill is in a closed position, covers said discharge opening.

22. A method as set forth in claim 21 wherein said extension includes at least guide vane extending into said discharge opening.

23. A method as set forth in claim 22 wherein said at least one guide vane includes a plurality of guide vanes.

24. An air conditioner as set forth in claim 7 wherein said grill retaining arm portion includes an attached L-shaped appendages which, partially define a u-shaped pocket for receiving and retaining the filter in its installed position.

25. A method as set forth in claim 16 wherein said retainer arm position comprises a u-shaped pocket and wherein the step of installing a filter in said frame includes the step of installing the filter in said pocket.

* * * * *